United States Patent
Leymarie et al.

(10) Patent No.: US 6,843,510 B2
(45) Date of Patent: Jan. 18, 2005

(54) SYSTEM FOR COUPLING A FUEL FEED HOSE WITH THE OPENING OF EQUIPMENT FOR FILLING A MOTOR VEHICLE TANK

(75) Inventors: Pascal Leymarie, Chalons en Champagne (FR); Dieter Belhauser, Chalons en Champagne (FR)

(73) Assignee: Marwal Systems, Chalons (FR)

( * ) Notice: Subject to any disclaimer, the term of this patent is extended or adjusted under 35 U.S.C. 154(b) by 34 days.

(21) Appl. No.: 10/183,087

(22) Filed: Jun. 26, 2002

(65) Prior Publication Data

US 2003/0080560 A1 May 1, 2003

(30) Foreign Application Priority Data

Jun. 26, 2001 (FR) ............................................ 01 08396

(51) Int. Cl.[7] ................................................. F16L 37/00
(52) U.S. Cl. ....................... 285/308; 285/319; 285/320; 285/62
(58) Field of Search ................................ 285/308, 319, 285/320, 423, 61, 62, 81

(56) References Cited

U.S. PATENT DOCUMENTS

| 1,043,683 | A | * | 11/1912 | Fieser ................... 285/148.16 |
|---|---|---|---|---|
| 2,672,356 | A | * | 3/1954 | Crockett ..................... 285/5 |
| 2,684,256 | A | * | 7/1954 | Krukowski ................. 285/6 |
| 2,687,905 | A | * | 8/1954 | Jacobs ....................... 285/6 |
| 3,391,899 | A | * | 7/1968 | Rundle ................... 251/149.6 |
| 4,673,200 | A | * | 6/1987 | Miyauchi ................ 285/319 |
| 5,048,875 | A | * | 9/1991 | Usui et al. .............. 285/319 |
| 5,067,754 | A | * | 11/1991 | Bartholomew ......... 285/319 |
| 5,338,071 | A | * | 8/1994 | Hohmann et al. ..... 285/233 |
| 5,725,258 | A | * | 3/1998 | Kujawski ............... 285/308 |
| 5,782,508 | A | * | 7/1998 | Bartholomew ......... 285/319 |
| 5,890,749 | A | * | 4/1999 | Fukaya et al. ......... 285/319 |
| 5,964,485 | A | * | 10/1999 | Hame et al. ............ 285/320 |
| 5,984,378 | A | * | 11/1999 | Ostrander et al. ..... 285/319 |
| 6,412,830 | B1 | * | 7/2002 | Akiyama et al. ...... 285/319 |
| 6,454,311 | B1 | * | 9/2002 | Berry ........................ 285/61 |
| 6,540,264 | B1 | * | 4/2003 | Yokoyama et al. .... 285/319 |

* cited by examiner

*Primary Examiner*—James Hewitt
(74) *Attorney, Agent, or Firm*—Blakely Sokoloff Taylor & Zafman

(57) ABSTRACT

A system for coupling the end of a fuel feed hose with the opening of feed equipment placed inside a motor vehicle fuel tank. The end of the hose and opening have resiliently snap-fastening complementary locking mechanisms provided with an elastically-deformable tongue which can be moved to perform unlocking. The tongue is positioned in such a manner that when equipment is mounted inside the tank, it comes into contact or nearly into contact with a wall zone of the tank in such a manner that unlocking the coupling system is not possible.

23 Claims, 5 Drawing Sheets

FIG_1

FIG. 6

FIG_8

FIG_9

FIG_10

SYSTEM FOR COUPLING A FUEL FEED HOSE WITH THE OPENING OF EQUIPMENT FOR FILLING A MOTOR VEHICLE TANK

FIELD OF THE INVENTION

The present invention relates to the field of drawing fuel on board a motor vehicle.

More precisely, the present invention relates to a device for connecting a hose used in a fuel feed device.

The present invention applies particularly but not exclusively to making a system for coupling the end of a fuel feed hose with an inlet opening of a reserve bowl in a motor vehicle fuel tank.

The invention also relates to a motor vehicle fuel tank containing a fuel feed device provided with such a coupling system.

BACKGROUND OF THE INVENTION

Known devices for drawing fuel from inside a vehicle tank generally comprise an electric pump which draws fuel from inside a reserve bowl placed within the tank.

The bowl serves to maintain a reserve of fuel for use in emergency when the fuel tank is practically empty or when it is tilted due to the vehicle cornering or being on a slope. The reserve bowl is fed with fuel in such a manner as to ensure that it contains fuel continuously. To this end, it is provided with an inlet opening on which it is possible to secure one of the ends of a fuel feed hose.

In prior art systems, this inlet opening is generally provided on its outside surface with a series of parallel annular ribs, and the fuel feed hose which is made of flexible material is merely engaged by force onto said opening, with the ribs having the effect of retaining the hose.

Nevertheless, such a fixing technique is unsatisfactory in that it is not easy to assemble and disassemble by hand.

OBJECTS AND SUMMARY OF THE INVENTION

The invention thus seeks to improve the way in which a fuel feed hose is fixed to a fuel feed device, e.g. the inlet opening of a reserve bowl.

This object is achieved by means of a system for coupling the end of a fuel feed hose with the opening of feed equipment placed inside a motor vehicle fuel tank.

In this coupling system, the end of said hose and said opening have resiliently snap-fastening complementary locking means provided with an elastically-deformable tongue which can be moved to perform unlocking, said tongue being positioned in such a manner that when said equipment is mounted inside the tank, it comes into contact or nearly into contact with a wall zone of the tank in such a manner that unlocking said coupling system is not possible.

According to other advantageous but non-limiting characteristics of the intention:

said complementary locking means comprise at least one projecting element and a cavity for receiving said projecting element;

said receiving cavity is formed in said elastically-deformable tongue;

said projecting element is provided on the outside surface of the feed hose, and said elastically-deformable tongue is secured to the opening of the equipment;

said opening is formed at the base of said equipment, and said elastically-deformable tongue is positioned in such a manner as to come into contact, or nearly into contact with the bottom of the tank when the equipment is mounted inside said tank, so as to prevent unlocking of the coupling system;

said elastically-deformable tongue extends substantially parallel to the longitudinal axis X–X' of the opening, one of its ends is hinged to the outside surface of said opening, and it presents said receiving cavity in its middle portion and a handle member at its opposite end enabling said tongue to be moved away from the hose to allow the complementary locking means to be unlocked, said handle member being suitable for coming into contact or nearly into contact with a zone of the wall of the tank when the equipment is mounted inside the tank, so as to prevent said coupling system from unlocking;

said elastically-deformable tongue extends substantially parallel to the axis Y–Y' of the opening, its middle portion is hinged on the outside surface of said opening, and it presents at one of its ends said receiving cavity and a locking shoe, and at its opposite end a handle member capable of being moved towards said outer surface to cause said receiving cavity to be moved away from the projection on the hose, thereby enabling the complementary locking means to be unlocked, the locking shoe being suitable for coming into contact or nearly into contact with a zone of the wall of the tank when the equipment is mounted inside the tank, so as to prevent said coupling system from being unlocked;

the elastically-deformable tongue possesses a sloping face making it easier to put the feed hose axially into the inside of said opening;

the projecting element is a stud; and the projecting element is an annular projection extending over the entire circumference of the outside surface of said hose and is obtained by chasing said outside surface outwards.

The invention also provides a motor vehicle fuel tank containing feed equipment provided with an opening.

The tank is remarkable in that said opening is coupled to the end of a fuel feed hose using the above-specified coupling system.

BRIEF DESCRIPTION OF THE DRAWINGS

Other characteristics and advantages of the present invention appear on reading the following detailed description made with reference to the accompanying drawings given as non-limiting examples, and in which.

MORE DETAILED DESCRIPTION

Figure 1:
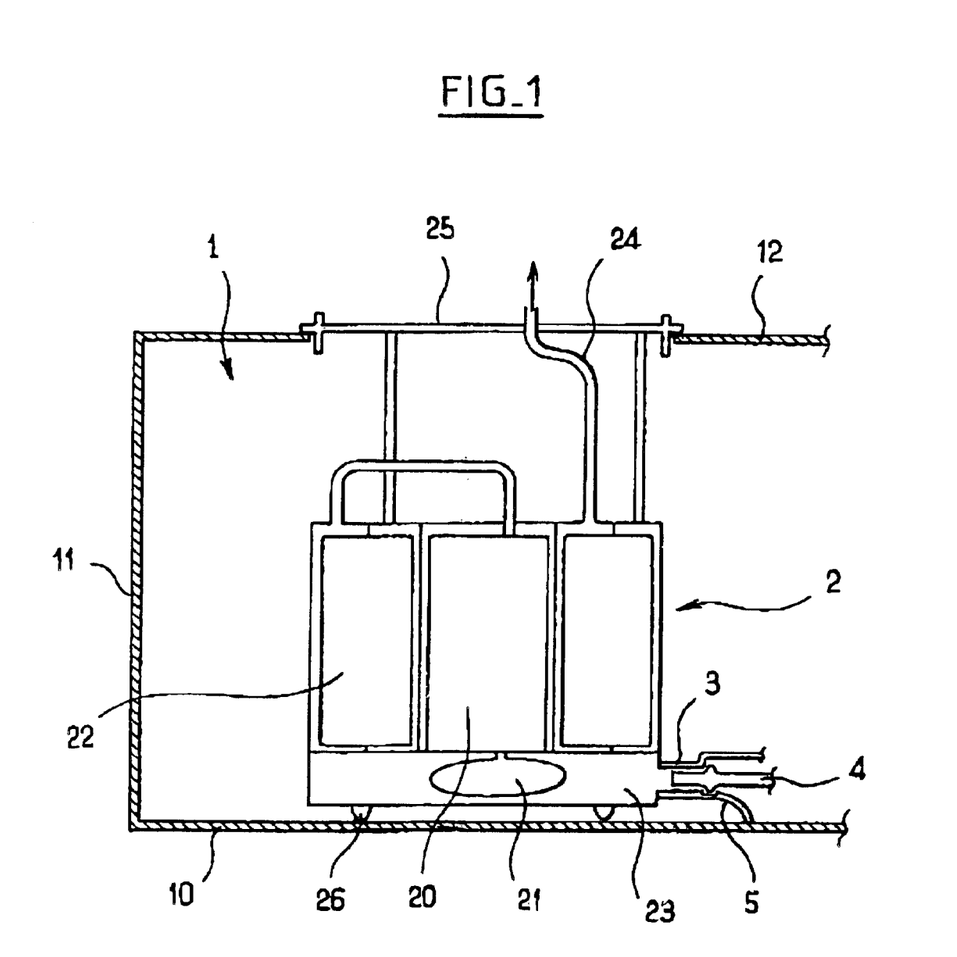
FIG. 1 is a diagrammatic view showing the general architecture of a fuel tank containing a reserve bowl, and provided with a coupling system of the invention.

FIG. 1 shows an example of architecture suitable for a fuel tank fitted with a drawing module that presents a reserve bowl and that corresponds to a first embodiment of the present invention.

More precisely, the fuel tank 1 presents a bottom wall 10, a side wall 11 having a plurality of facets, and a top wall 12.

The fuel-drawing module 2 is placed inside the tank 1. It generally comprises an electric pump 20, a primary filter 21, a secondary filter 22 that is finer, and a reserve bowl 23.

The electric pump 20 is vertically oriented. Its inlet is connected to the primary filter 21 or strainer that is to be found in the reserve bowl 23. The outlet from the electric pump 20 delivers into the secondary filter 22 which, in the embodiment of FIG. 1, is an annular filter placed around the pump 20.

The fuel leaving said electric pump 20 passes radially through the secondary filler 22, and then leaves this filter via a pipe 24 carried by a support 25 for fixing to the top wall 12 of the tank 1.

In addition, the reserve bowl 23 stands on legs 26.

The drawing module 2 is mounted inside the tank 1 so that the legs 26 touch the bottom of the tank, thereby ensuring that the reserve bowl 23 is at a short distance from the bottom.

Nowadays, most fuel tanks are made of plastics material. As a result, the bottom 10 can frequently become deformed under the action of the weight of the fuel or of thermal stresses. To ensure that the reserve bowl 23 does not lose contact with the bottom 10 of the tank, the drawing module 2 can be mounted so as to be free to move in translation relative to the support 25, with the assistance of springs serving to urge the bowl continuously against the bottom 10 of the fuel tank. Nevertheless, this variant is not shown in FIG. 1 for reasons of simplification.

The drawing module 2 also has an inlet opening 3 provided in the base of the reserve bowl 23.

The structure of this drawing module is conventional, is known to the person skilled in the art, and is therefore not described in greater detail.

Finally, one of the ends of a fuel feed hose 4 is connected to said inlet opening 3 by a coupling system as described below.

The other end of the feed hose 4 is connected either to the vehicle engine, in which case the feed hose 3 serves as a fuel return hose, or else to a jet pump placed between said engine and the reserve bowl 23. By way of example, for a tank having two volumes, the jet pump may be located in a second volume, i.e. in a volume that does not contain the drawing module 2. One such variant is described below with reference to FIG. 6.

The coupling system of the invention generally comprises resiliently snap-fastening complementary locking means including an elastically-deformable tongue which can be deformed for unlocking purposes.

Advantageously, those complementary locking means comprise at least one projecting element provided on the outside surface of said feed hose and a cavity for receiving said projecting element, which cavity is formed in said elastically-deformable tongue, with the tongue being secured to the inlet opening of the reserve bowl.

A first embodiment of such a coupling system is described below in greater detail with reference to FIGS. 2 and 3.

Figure 2:
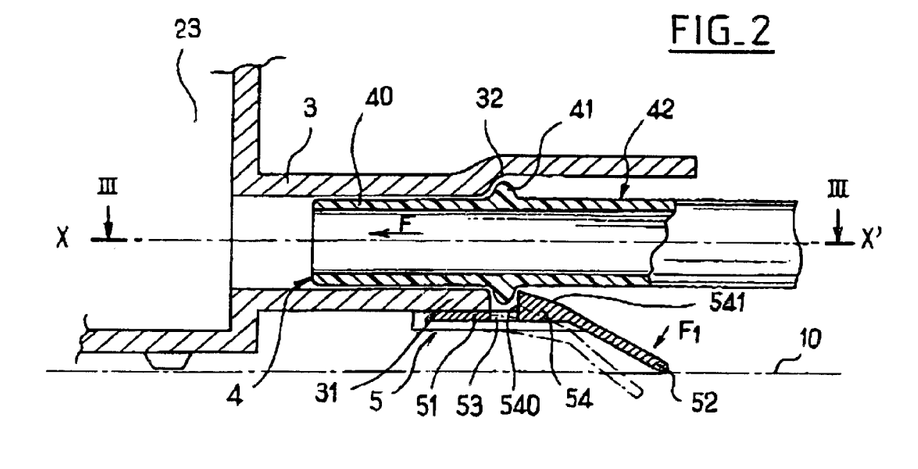
FIG. 2 is a vertical longitudinal section view through a first embodiment of the coupling system of the invention.

As shown in FIG. 2, the end 40 of a fuel feed hose 4 is inserted axially (arrow F) into the inlet opening 3. This hose 4 has at least one projecting element or stud 41 extending radially outwards from its outside surface 42. Advantageously, this projection 41 is made integrally out of the same material as the hose 4.

The feed hose 4 preferably presents a plurality of studs that are uniformly distributed around its outer circumference, so as to enable it be inserted into the inlet opening 3 in any angular position, or else it may be in the form of a continuous annular collar 41.

An elastically-deformable tongue 5 is provided on the outside surface of the end 31 of the inlet opening 3. This tongue extends in a general direction that is substantially parallel to the longitudinal axis X–X' of said inlet opening 3.

The tongue 5 is hinged at one of its ends 51 to the end 31 of the inlet opening 3. At its opposite end, the tongue has a handle or bearing tab 52. In its middle portion it also presents a cavity 53 and a stop catch 54.

The cavity 53 is said to be a "receiving" cavity for receiving the stud 41 when the hose 4 is inserted into the inlet opening 3.

As can be seen more clearly in FIG. 2, the stop catch 54 is an element that projects from the tongue 5 towards the inside of the inlet opening 3. The catch 54 is triangular in section. Its vertical front face 540 co-operates with the end 31 of the inlet opening, and the front end 51 of the tongue 5 so as to define the receiving cavity 53. Its sloping rear face 541 serves to facilitate axial insertion of the hose 4 into the inlet opening 3.

Figure 3:
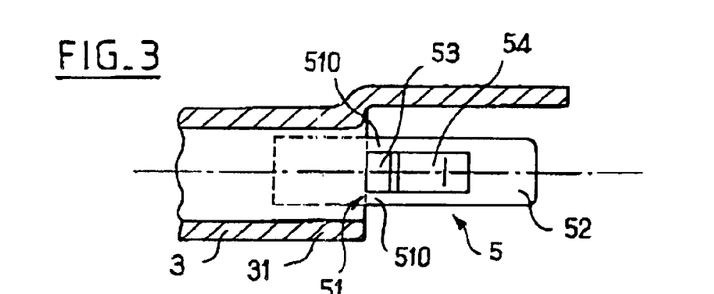
FIG. 3 is a fragmentary view on section plane III—III of FIG. 2.

In addition, as can be seen more clearly in the plan view of FIG. 3, the cavity 53 is defined laterally by two strips of material 510. These strips constitute a zone of weakness and they act as hinges so as to make it easier for the tongue 5 to move outwards from the inlet opening 3.

The handle member 52 slopes towards the outside of the opening 3 (i.e. downwards in FIG. 2) in such a manner as to enable an operator to insert a finger between this member and the hose 4.

The operation of this coupling system is described below in greater detail.

When an operator pushes against the handle member 52 (represented by arrow F1 in FIG. 2) the resilient tongue 5 deforms in the vicinity of its hinge zone 51, 510. The resilient tongue 5 can thus move between a locking, first position (shown in continuous lines) where the stud 41 on the hose 4 is received inside the receiving cavity 53, and an unlocking, second position (shown in dashed lines) where it is spaced apart from the hose 4 so that the stud 41 is released.

Advantageously, the resilient tongue 5 is positioned on the inlet opening 3 in such a manner that the inclined handle member 52 comes into contact or nearly into contact with the bottom 10 of the fuel tank 1 when the reserve bowl 23 of the drawing module 2 is mounted inside the tank 1.

When the handle member 52 is in contact with or very close to said bottom 10, it is prevented from being moved away downwards towards the position shown in dashed lines. Consequently, the bottom 10 of the tank co-operates with the resilient tongue 5 to prevent the coupling system from unlocking. The fact that the drawing module 2 (and thus the reserve bowl 23) can be pressed against the bottom 10 of the tank by means of springs, as explained above, further reinforces this co-operation between the bottom of the tank and the resilient tongue 5 for preventing the stud 41 being unlocked.

The feed hose 4 therefore does not run any risk of being pulled out from the inlet opening 3.

It should be observed that the term "nearly in contact" means that the tongue 5 and specifically its end 52 is at a distance from the bottom 10 that is so small that the tongue 5 cannot be moved far enough away to enable the coupling system to be unlocked.

In a variant embodiment not shown in the figures, the inlet opening 3 may be disposed vertically on one of the sides of the reserve bowl 23 in which case the bowl is placed inside the fuel tank 1 in such a manner that the handle member 52 comes into contact or nearly into contact with one of the side walls 11 of the tank.

A second embodiment of the coupling system of the invention is described with reference to FIG. 4.

In this variant, the inlet opening is given overall reference 6 and the feed hose reference 7.

In this variant, the end 70 of the hose 7 for insertion into the opening 6 presents a projecting element referenced 71. This element is in the form of an annular projection extending around the entire periphery of the outside surface 72 of said hose 7.

Advantageously, this projection 71 is made integrally with the hose 7. It is obtained by chasing the outside surface 72 to form a fold whose longitudinal section is substantially triangular in shape having a tip 710 sloping in the opposite direction to the direction F in which the feed hose 7 is coupled into the opening 6. The front face of this annular projection is referenced 711.

On its inside face the inlet opening 6 presents an annular shoulder 60 for receiving an O-ring 8 placed around the hose 7. This O-ring 8 is held in place by an annular retaining sleeve 80.

In addition, it should be observed that the rim 61 of the inlet opening 6 is chamfered, flaring outwards, thereby enabling it to co-operate with the front face 711 of the projection 71 when the hose 7 is inserted into the inlet opening 6.

Finally, the inlet opening 6 presents an elastically-deformable tongue 9 extending in a general direction that is substantially parallel to the longitudinal axis Y–Y' of said inlet opening 6.

The elastically-deformable tongue 9 is advantageously integrally formed with the opening 6. It is hinged to the outside surface 62 thereof, in the vicinity of its middle, about a fine strip of material 90 that forms a hinge, this strip extending in a plane perpendicular to the axis Y–Y'. There therefore exists a small amount of clearance i between the outside surface 62 of the opening 6 and the facing surface 91 of the tongue.

At one of its ends, the tongue 9 has a handle member 92 or bearing tab, and at its opposite end it has a hook 93 and a locking shoe 94.

The handle member 92 is similar in shape to the member 52 described above for the first embodiment of the invention. It is slightly inclined so as to go away from the inlet opening 6.

The hook 93 extends from said tongue 9 towards the axis Y–Y'. In longitudinal section it is triangular in shape with its tip 930 sloping in the same direction as the axial direction F for coupling the hose 7 in the opening 6. Its sloping rear face 931 co-operates with the surface 91 of the tongue to define the receiving cavity 95 that is to receive the projection 71. Its sloping front face 932 facilitates axial insertion of the hose 7.

The locking shoe 94 situated at the end of the tongue 9 that carries the hook 93 extends substantially radially outwards from said tongue 9.

When an operator applies thrust (represented by arrow F2) on the handle member 92, the resilient tongue 9 pivots about its hinge 90 which is made possible by the clearance i, such that the hook 93 tends to move away from the hose 7 (arrow F3). The hose 7 can then be put into place, or on the contrary it can be withdrawn from the opening 6.

Figure 4:
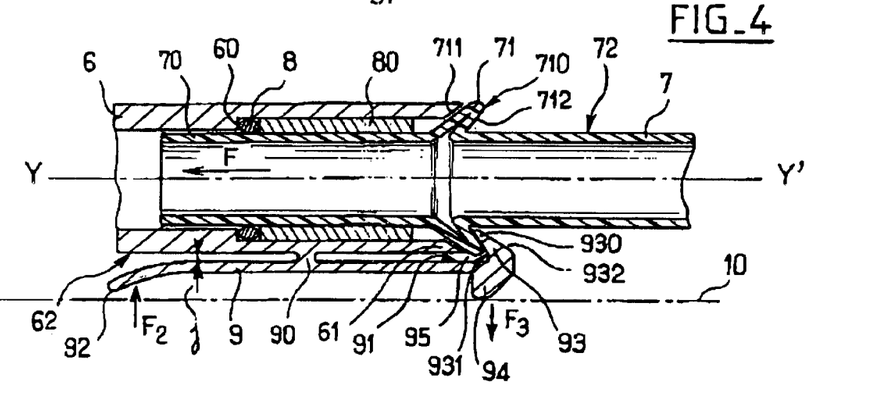
FIG. 4 is a vertical longitudinal section view of a coupling system in a second embodiment of the invention.

When the operator ceases to exert thrust on the handle member 92, the resilient tongue 9 deforms so as to return to the locked position as shown in FIG. 4, In addition, when the reserve bowl 23 is mounted inside the fuel tank 1, the locking shoe 94 comes into contact or nearly into contact with the bottom 10 of the tank, so the system can no longer be unlocked. When contact is made, the thrust exerted by the bottom 10 on the shoe 94 tends to urge the hook 93 further towards the projection 71. When contact is nearly made, the distance between the locking shoe 94 and the bottom 10 is so small that the shoe 94 cannot be moved far enough to release the projection 71.

As for the first embodiment, the tongue 9 could also co-operate with the side wall 11 of the tank, or indeed with the top wall 12.

Naturally, the present invention is not limited to the embodiments described above, but extends to any variant within the spirit of the invention.

The present invention also applies to devices for drawing fuel without using a reserve bowl.

The description above relates to embodiments in which the projections or studs 41 or 71 are formed integrally on the hose 4, 7.

In a variant, and in particular for high pressure devices, the projections or studs can be fitted to the hose.

Figure 5:
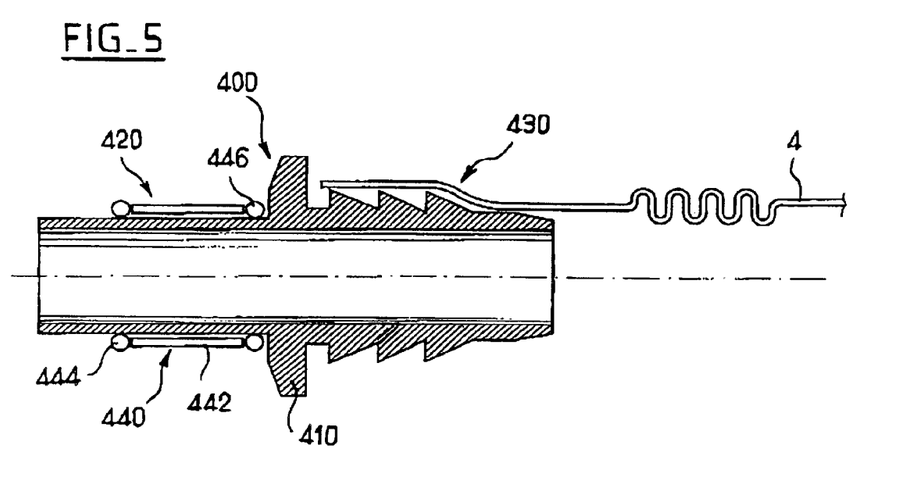
FIG. 5 is a diagrammatic longitudinal section view of an endpiece constituting a variant of the invention, and suitable for being driven into the end of a hose.

By way of example, FIG. 5 shows an annular piece 400 for driving into the end of a hose 4. This annular piece 400 constitutes an endpiece. By way of example it can be made as a molding of plastics material.

Substantially halfway along its length it has an annular collar 410 which performs the same function as the above-described projections 41, 71. The collar 410 thus serves to co-operate with a tongue 5 or 9.

On one side of the collar 410, the endpiece 400 is provided with a segment 420 that is to penetrate into the opening 3, 6.

On the other side of the collar 410, the endpiece 400 is provided with leaktight fixing means 430 for engaging the hose 4. By way of example, such means 430 can be constituted by a series of ridges of triangular right section, as shown in FIG. 5. The faces of these ridges 430 facing towards the collar 410 are perpendicular to the axis of the endpiece 400. The opposite faces of the ridges 430 facing towards the end of the endpiece 400 are, on the contrary, inclined so as to facilitate engaging the endpiece 400 in the hose 4.

Sealing means 440 are also preferably provided on the first segment 420. Such sealing means 440 can be based on O-rings. By way of example, FIG. 5 shows an embodiment in which the sealing means comprise two O-rings 444 and 446 disposed at opposite ends of a spacer ring 442.

The description above relates to coupling a hose to the inlet opening of a reserve bowl. Nevertheless, the invention is not limited to that particular circumstance. Specifically, the invention applies to coupling to equipment other than a reserve bowl, for example to fuel feed equipment of the jet pump type, in particular for transferring fuel from an auxiliary volume towards a main volume of the tank, or indeed towards a reserve bowl.

The present invention is also equally applicable to coupling with an inlet or with an outlet of a piece of fuel feed equipment.

Figure 6:
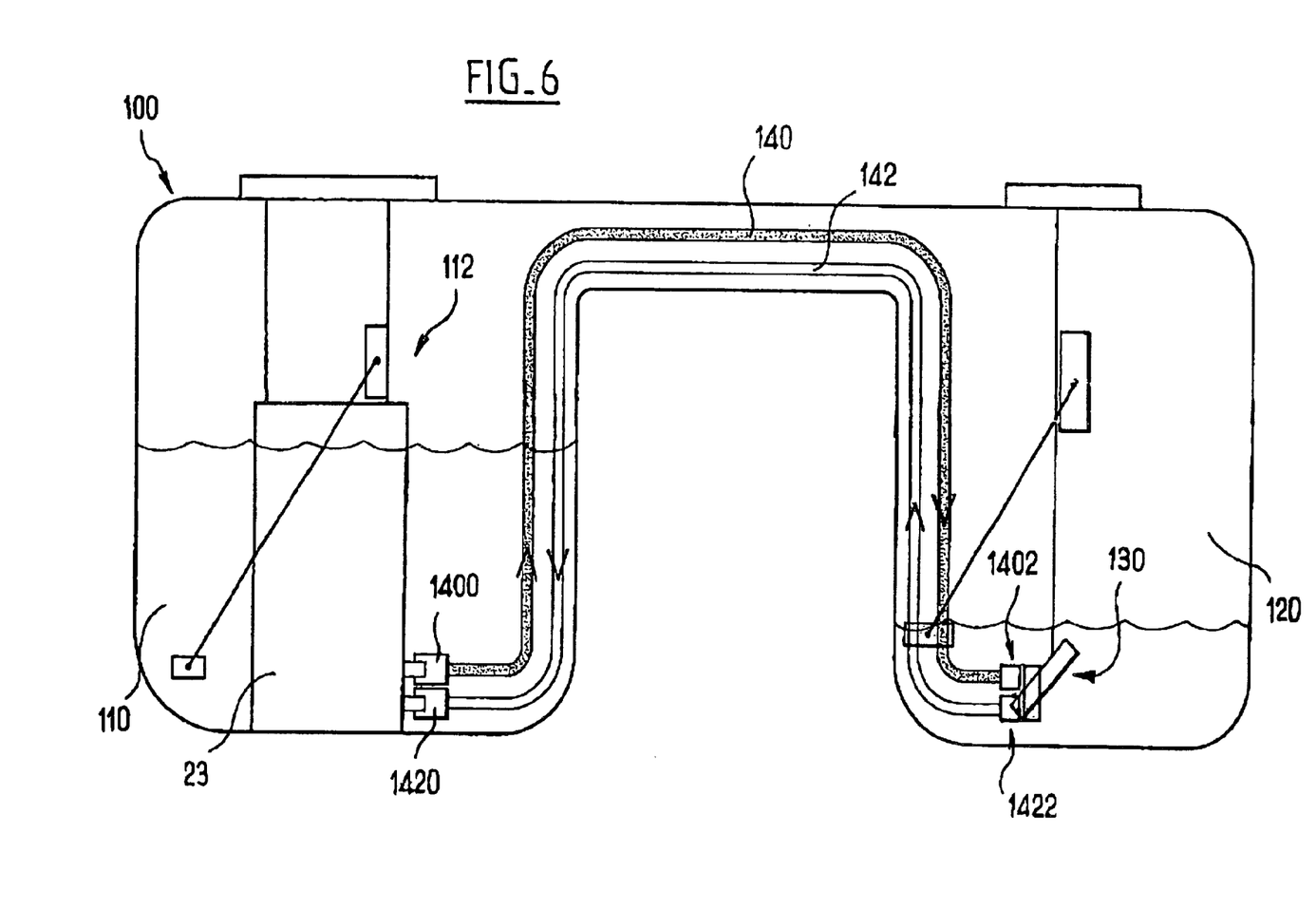
FIG. 6 is a vertical section view of a tank in another variant of the invention, the tank being of the two-volume type.

FIG. 6 shows an embodiment of a two-volume fuel tank 100: it comprises a main volume 110 and an auxiliary volume 120.

The main volume 110 receives conventional fuel-drawing equipment of the type shown in FIG. 1, said equipment including an electric pump which draws fuel from a reserve bowl 23. This main equipment is also fitted with a fuel gauge device 112.

The auxiliary volume 120 houses an auxiliary piece of fuel-drawing equipment of the jet pump type.

The nozzle of this jet pump 130 is of the converging type and is fed from an outlet stage of the electric pump via a duct 140. The outlet from the jet pump 130 conveying the fuel taken from the auxiliary volume 120 conveys said fuel to the reserve bowl 23 via a second duct 142.

The two connections 1400, 1402, and 1420, 1422 connecting the ends of the ducts 140, 142, respectively with the main feed equipment 23 (reserve bowl) and with the jet pump 130, are preferably connections in accordance with the invention.

Figure 7:
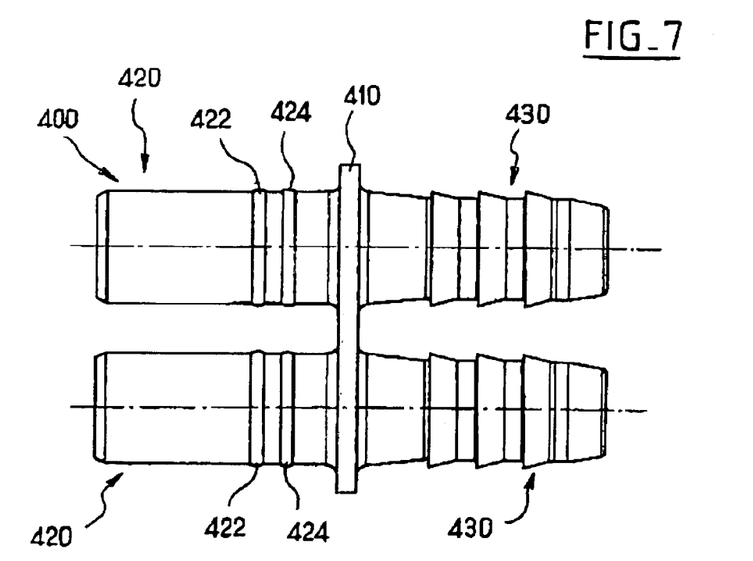
FIG. 7 shows a variant endpiece in accordance with the present invention.

When two adjacent hoses 4 or 7, both fitted with an endpiece 400 in accordance with the dispositions described with reference to FIG. 5, are used in the context of the present invention, it is possible to make such endpieces 400 as a single part 4000 comprising two endpieces, as shown in FIG. 7. Under such circumstances, and preferably, the two endpieces 400 are united by means of a common collar 410.

In another variant embodiment, the jet pump 130 can be fed using the fuel returned from the engine. Under such circumstances, a single hose 142 connects the jet pump 130 and the main fuel-drawing equipment 23, more precisely, the outlet from the jet pump 130 to the inlet of the main fuel-drawing equipment 23.

Figure 8:
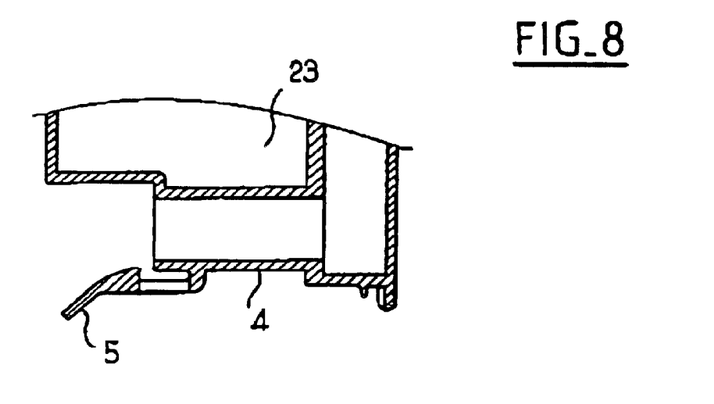
FIG. 8 shows a variant of a locking tongue in accordance with the present invention.

FIG. 8 shows a variant embodiment of the tongue 5 on accordance with the present invention.

Figure 9:
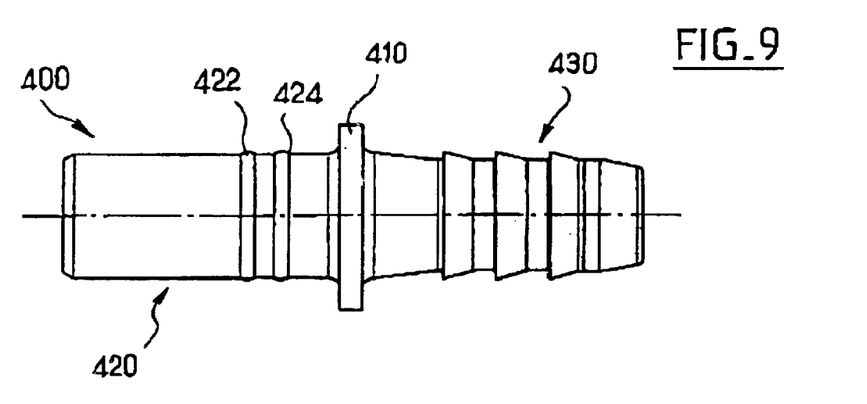
FIG. 9 is an outside view and FIG. 10 is a longitudinal section view of an endpiece constituting another variant embodiment of the present invention.
Figure 10:
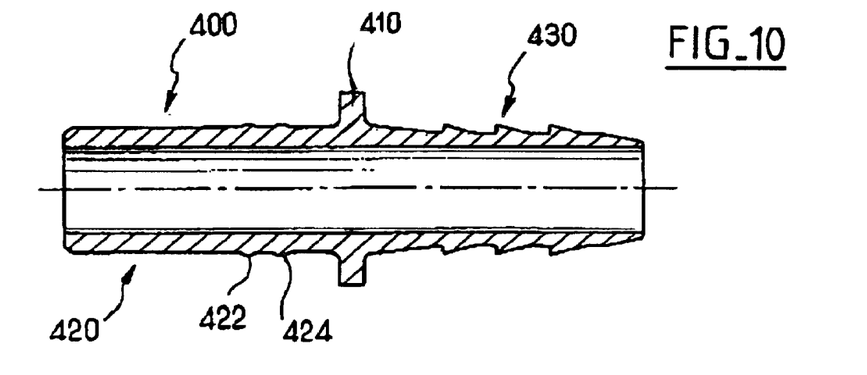

FIGS. 9 and 10 show a variant embodiment of the endpiece 400 in accordance with the present invention in which the segment 420 has two rounded annular projections 422 and 424 integrally molded therewith for replacing the O-rings shown in FIG. 5, for sealing purposes.

The coupling device of the present invention provides the advantage of making it easy to couple and uncouple by hand. In particular, it makes insertion and removal easy, both during assembly and for repair purposes.

What is claimed is:

1. A system for coupling the end of a fuel feed hose with the opening of feed equipment placed inside a motor vehicle fuel tank, wherein the end of said hose and said opening have resiliently snap-fastening complementary locking means provided with an elastically-deformable tongue which can be moved to perform unlocking, said tongue being positioned in such a manner that when said equipment is mounted inside the tank, it comes into contact or nearly into contact with a wall zone of the tank in such a mannner that unlocking said coupling system is not possible.

2. A coupling system according to claim 1, wherein said complementary locking means comprise at least one projecting element and a cavity for receiving said projecting element.

3. A coupling system according to claim 2, wherein said receiving cavity is formed in said elastically-deformable tongue.

4. A coupling system according to claim 3, wherein said projecting element is provided on the outside surface of the feed hose, and wherein said elastically-deformable tongue is secured to the opening of the equipment.

5. A coupling system according to claim 1, wherein said opening is formed at the base of said equipment, and wherein said elasticallv-deformable tongue is positioned in such a manner as to come into contact or nearly into contact with the bottom of the tank when the equipment is mounted inside said tank, so as to prevent unlocking of the coupling system.

6. A coupling system according to claim 4, wherein said elastioally-deformable torque extends substantially parallel to the longitudinal axis x–x' of the opening, wherein one of its ends is hinged to the outside surface of said opening, end wherein said tongue presents said receiving cavity in its middle portion and a handle member at its opposite end enabling said tongue to be moved away from the hose to allow the complementary locking means to be unlocked, said handle member being suitable for coming into contact or nearly into contact with the zone of the wall of the tank when the equipment is mounted inside the tank, so as to prevent said coupling system from unlocking.

7. A coupling system according to claim 4, wherein said elastically-deformable tongue extends substantially parallel to the axis Y–Y' of the opening, wherein its middle portion is hinged on the outside surface of said opening, and wherein it presents at one of its ends said receiving cavity and a locking shoe, and at its opposite end a handle member capable of being moved towards said cuter surface to cause said receiving cavity to be moved away from said projecting element on the hose, thereby enabling the complementary locking means to be unlocked, the locking shoe being suitable for coming into contact or nearly into contact with the zone of the wall of the tank when the equipment is mounted inside the tank, so as to prevent said coupling system from being unlocked.

8. A coupling system according to claim 3, wherein the elastically-deformable tongue possesses a sloping face making it easier to put the feed hose axially into the inside of the opening.

9. A coupling system according to claim 2, wherein the projecting element is a stud.

10. A coupling system according to claim 2, wherein the projecting element is an annular projection extending over the entire circumference of the outside surface of said hose and is obtained by chasing said outside surface outwards.

11. A coupling system according to claim 1, wherein the projecting element is made integrally on the hose.

12. A coupling system according to claim 1, wherein the projecting element is constituted by a piece fitted to the hose.

13. A coupling system according to claim 12, wherein the fitted piece has an intermediate collar placed between a segment for engaging in the opening and a segment for driving into the hose.

14. A coupling system according to claim 12, wherein the fitted piece is common to two hoses, having a single collar.

15. A coupling system according to claim 12, wherein the fitted piece is provided with sealing means.

16. A coupling system according to claim 15, wherein the sealing means comprise at least one O-ring.

17. A coupling system according to claim 15, wherein the sealing means comprise two O-rings placed respectively at opposite ends of a spacer ring.

18. A coupling system according to claim 15, wherein the sealing means comprise at least one annular projection integrally molded therewith.

19. A coupling system according to claim 1, wherein the equipment is a reserve bowl.

20. A coupling system according to claim 1, wherein the equipment is a jet pump.

21. A coupling system according to claim 1, the system being placed at the inlet of the equipment.

22. A coupling system according to claim 1, the system being placed on the outlet of the equipment.

23. A motor vehicle fuel tank containing at least one feed equipment provided with an opening, wherein said opening is coupled with the end of a fuel feed hose by means of a coupling system according to claim 1.

* * * * *